US006654417B1

(12) United States Patent
Hui

(10) Patent No.: US 6,654,417 B1
(45) Date of Patent: Nov. 25, 2003

(54) ONE-PASS VARIABLE BIT RATE MOVING PICTURES ENCODING

(75) Inventor: Yau Wei Lucas Hui, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 0 days.

(21) Appl. No.: 09/600,935

(22) PCT Filed: Jan. 26, 1998

(86) PCT No.: PCT/SG98/00007
§ 371 (c)(1),
(2), (4) Date: Oct. 11, 2000

(87) PCT Pub. No.: WO99/38333
PCT Pub. Date: Jul. 29, 1999

(51) Int. Cl.[7] ................................................. H04N 7/12
(52) U.S. Cl. ............................... 375/240.03; 375/240.02
(58) Field of Search ....................... 375/240.02, 240.03, 375/240.05, 240.07; 348/419.1; 382/251

(56) References Cited

U.S. PATENT DOCUMENTS

| | | | | |
|---|---|---|---|---|
| 5,686,963 A | * | 11/1997 | Uz et al. ................ | 375/240.06 |
| 5,926,222 A | * | 7/1999 | Nickerson ............... | 375/240.04 |
| 5,926,569 A | * | 7/1999 | Nickerson ............... | 382/232 |
| 5,959,677 A | * | 9/1999 | Date et al. .............. | 375/240.01 |
| 6,118,817 A | * | 9/2000 | Wang ..................... | 375/240.03 |
| 6,181,742 B1 | * | 1/2001 | Rajagopalan et al. ....... | 375/240 |
| 6,185,253 B1 | * | 2/2001 | Pauls ..................... | 375/240.02 |
| 6,192,075 B1 | * | 2/2001 | Jeng et al. ............... | 375/240 |
| 6,219,359 B1 | * | 4/2001 | Budge et al. ............. | 370/538 |

FOREIGN PATENT DOCUMENTS

| | | | |
|---|---|---|---|
| EP | 000742674 A2 | * 11/1996 | ............ H04N/7/30 |
| EP | 000759667 A2 | * 2/1997 | ............ H04N/7/58 |

OTHER PUBLICATIONS

DeCleene et al., "Comparison of priority partition methods for VBR MPEG", 13th Proceedings Networking for Global Communications, IEEE, vol. 2, pp. 689–696.*
Cicalini et al., "Dynamic Psychovisual Bit Allocation For Improved Quality Bit Rate In MPEG–2 Transmission Over ATM Links", Electronics Letters, vol. 32, No. 4, Feb. 1996, pp. 370–371.*
Sugiyam et al., "Video disc system using variable bit rate", International Conference on Consumer Electronics, Jun. 1995, pp. 86–87.*
Chiang et al., "A new rate control scheme using quadratic rate distortion model", IEEE Transactions on Circuits and Systems fo Video Technology, vol. 7, No. 1, Feb. 1997, pp. 246–250.*

* cited by examiner

Primary Examiner—Vu Le
(74) Attorney, Agent, or Firm—Lisa K. Jorgenson; David V. Carlson; SEED IP Law Group PLLC

(57) ABSTRACT

A method and apparatus for encoding digital video utilizing a single pass variable bit rate encoding procedure. An encoding quality is set and the bit rate for encoding blocks or frames in the sequence of moving pictures is determined to achieve the selected quality according to the complexity of the video sequence. The bit rate is constrained by predetermined upper and lower bit rate limits.

41 Claims, 3 Drawing Sheets

ONE-PASS VARIABLE BIT RATE MOVING PICTURES ENCODING

FIELD OF THE INVENTION

The present invention relates to a method and apparatus for encoding moving pictures. In particular, the present invention relates to a method and apparatus for performing variable bit rate control for a digital video encoder.

BACKGROUND OF THE INVENTION

Digital compression has been applied to moving pictures for the purposes of transmissions bandwidth or storage size reduction. One current art of such compression techniques can be derived from the ISO/IEC MPEG Standards, the ISO/IEC 11172-3 (MPEG-1), the ISO/IEC 13818-2 (MPEG-2) and the MPEG-2 TM5 (test model 5), developed by the Moving Picture Experts Group of the International Organisation for Standardization. The disclosures of those standards documents are hereby expressly incorporated into this specification by reference.

In a standard MPEG compliant video encoder, a sequence of moving pictures (e.g. video) is input to the encoder where it is compressed with a user defined target bitrate. The target bitrate is set according to the communication channel bandwidth in which the compressed video is to be transmitted, or the storage media capacity in which the compressed video sequence is to be stored.

Several different forms of coding can be employed depending upon the character of the input pictures, referred to as I-pictures, P-pictures, or B-pictures. The I-pictures are intra-coded pictures used mainly for random access or scene update. The P-pictures use forward motion predictive coding with reference to previously coded I- or P-pictures (anchor pictures), and the B-pictures use both forward and backward motion predictive/interpolative coding with reference to previously coded I- or P-pictures. Furthermore, a group of picture (GOP) is formed in encoded order starting with an I-picture and ending with the picture before the next I-picture in the sequence.

The pictures are partitioned into smaller and non-overlapping blocks of pixel data called Macroblocks (MBs) before encoding. Each MB from a P- or B-picture is subjected to a motion estimation process in which forward motion vectors, and backward motion vectors in the case of a B-picture MB, are determined using reference pictures from a frame buffer. With the determined motion vectors, motion compensation is performed where the intra-or inter-picture prediction mode of the MB is first determined according to the accuracy of the motion vectors found, followed by generating the necessary predicted MB.

The predicted MB is then subjected to discrete cosine transform (DCT) and DCT coefficients quantization based on quantization matrices (QM) and quantization stepsize (QS). The quantized DCT coefficients of the MB is then run-length encoded with variable length codes (VLC) and multiplexed with additional information such as selected motion vectors, MB coding modes, quantization stepsize, and/or picture and sequence information, to form the output bitstream.

Local decoding is performed by inverse quantizing the quantized DCT coefficients, followed by inverse DCT, and motion compensation. Local decoding is performed such that the reference pictures used in the motion compensation are identical to those to be by an external decoder.

The quantization stepsize (QS) used for quantizing the DCT coefficients of each MB has direct impact on the number of bits produced at the output of the VLC encoding process, and therefore the average output bit rate. It has also a direct impact on the encoding quality, which is output picture quality at the corresponding decoder. In general, larger QS generates lower output bit rate and lower encoding quality. In order to control output bit rate and picture quality so that the resulting bitstream can satisfy channel bandwidth or storage limitations as well as quality requirements, rate control and quantization control algorithms are used.

Some methods for rate control and quantization control can be found in the abovementioned MPEG-2 TM5 (Test Model 5). These methods comprise generally a bit allocation process, a rate control process, and an adaptive quantization process. In the bit allocation process, a target number of bits is assigned for a new picture to be coded according to a number of previously determined and present parameters. The rate control step then calculates a reference quantization stepsize $QS_{ref}$ for each MB based on the target bits for the picture, the number of bits already used from the target bits in encoding MBs from that picture, and a virtual buffer model as given in MPEG-2 TM5. In the adaptive quantization process, the calculated $QS_{ref}$ is then scaled according to local activities of the MB, and an average MB activity determined from the previously coded picture. This scaling is done according to a level of masking effects of coding noise by human perception for MB with high or low activities within a picture. An example of an adaptive quantization technique is disclosed in U.S. Pat. No. 5,650,860, entitled "Adaptive Quantization". A video buffer verifier (VBV) may also be employed in such a way that underflow and overflow are prevented as required by the MPEG standard to ensure the target bit rate is maintained. Techniques for underflow detection and protection are also disclosed in U.S. Pat. No. 5,650,860.

It is apparent that the fixed target bitrate in the process outlined above has little or no relationship to the actual or varying complexity of the video scenes contained in the input picture sequence. The target bitrate is actually defined by the communication channel bandwidth, or by the target storage capacity for the picture sequence, but the perceptual quality of the resulting pictures when decoded may vary from good to annoying from scene to scene according to scene complexity.

For applications where picture sequences are compressed for storage and retrieval, for example DVD (Digital Video Disc or Digital Versatile Disc), variable bit rate (VBR) may be applied on individual segments of the picture sequences depending on its scene complexity to maximize bit rate allocation and encoded picture quality. Data bits may be reduced for less complex scene to save storage space and increase potential recording duration of the medium, or the resulting storage saving can be used for coding of more complex scenes.

Similarly, VBR can also be applied to other applications such as a multi channel video broadcasting network. Such channel bandwidth may be dynamically allocated to individual video sequences to be multiplexed together so that higher percentage of the bandwidth is used adaptively by sequences with complex scenes.

Existing VBR control algorithms such as that disclosed in U.S. Pat. No. 5,650,860 require multiple encoding passes to properly distribute data bits. In the first coding pass, the bit utilization information is determined for each scene or each picture in the input picture sequence. This may be done by fixing the reference quantization stepsize and disabling the VBV control.

The determined bit utilization information is then be used to generate a bit budget for each scene or picture such that an overall target number of bits to code the sequence is fixed, and so that a maximum bit rate is not violated. To accomplish this, the bit budget for each picture is modified so that the VBV buffer does not underflow. In cases that initial bit utilization information obtained is unrealistic for generating the bit budget, steps from the first coding pass must be repeated with an adjusted reference quantization stepsize. The input sequence is coded in a final pass using the generated bit budget information to achieve the target bits or bit rate. This form of multiple-pass VBR encoder requires very large storage memory for storing the intermediate bit utilization information, and large computational capacity for the additional passes and the bit budget generation. Furthermore, such VBR technique such as this cannot process the input sequence in real-time.

SUMMARY OF THE INVENTION

An object of the present invention is to provide a one-pass variable bit rate control technique for coding of moving pictures.

In accordance with the invention, there is provided a method for variable bit rate control in a single pass moving pictures encoder, comprising:

selecting a target picture encoding quality;

selecting upper and lower bit rate limits;

encoding at least one picture based on a target bit rate within the upper and lower bit rate limits;

predicting a current bit rate and an encoding quality based on the result of the encoding step;

comparing the encoding quality of the at least one encoded picture with the target picture encoding quality;

adjusting the target bit rate within the upper and lower bit rate limits according to the result of said comparison and the predicted current bit rate, for encoding subsequent pictures; and repeating, for each picture in a sequence of pictures, said encoding, predicting, comparing and adjusting steps.

In one form of the invention, the picture encoding quality is based on a mean square error. Alternatively, the picture encoding quality may be based on a signal-to-noise ratio. Preferably the comparing step including measuring a difference in picture encoding quality between corresponding input and locally decoded pictures.

In a particular form of the invention, the pictures to be encoded are arranged in groups of pictures comprising an I-picture and at least one P-picture and/or B-picture, and wherein the target bit allocation is adjusted for each picture or plurality of pictures in each group of pictures. Preferably the target bit allocation is adjusted to achieve a target bit rate, determined on the basis of said comparison, for each picture or plurality of pictures in the group of pictures.

The target picture encoding quality may comprise a target encoding quantization step-size, wherein different target quantization step-sizes are selected for I-, P- and B-pictures.

In one form of the invention, the method may include measuring an average quantization step-size for at least one previously encoded picture, predicting a bit rate for a previously encoded I-, P-, and B-picture, and determining said target bit rate based on said predicted bit rate and a difference between the target encoding quantization step-size and the measured average quantization step-size.

The method of the invention may include measuring an average picture activity for the moving pictures, and modifying the measured difference in picture encoding quality on the basis of the average picture activity.

The present invention also provides a control apparatus for a single pass moving pictures encoder, comprising:

an input for receiving a target picture encoding quality;

an input for receiving upper and lower bit rate limits; and a controller for controlling the encoder so as to encode at least one picture according to a target bit rate within the upper and lower bit rate limits, predict a current bit rate and an encoding quality based on the result of the encoding, compare the encoding quality of the at least one encoded picture with the target picture encoding quality, and adjust the target bit rate according to the result of said comparison and the predicted current bit rate for encoding subsequent pictures.

Preferably the moving picture encoder includes a frequency transform coefficient quantizer for quantization of the encoded picture data, and wherein the controller comprises a bit rate controller coupled to control the quantization step size of the quantizer, a quantization step size comparator for comparing, as a measure of encoding quality, and actual quantization step size with a target quantization step size based on the target picture encoding quality, a bit allocation processor coupled to control the bit rate controller according to a number of bits remaining for encoding a group of pictures, and a target bit rate estimator coupled to receive the upper and lower bit rate limits and coupled to the bit allocation processor and the bit rate controller for controlling the quantization so that the required bit rate for the quantized picture data is within the upper and lower bit rate limits.

The present invention further provides a single pass variable bit rate video picture encoder comprising:

a picture input for receiving data for a plurality of moving pictures;

a target quality input for receiving a target quality measure for encoded pictures;

an encoder output for supplying encoded picture data;

a bit rate limit input for receiving upper and lower bit rate limits for the encoded picture data;

a bit rate predictor for predicting a current bit rate;

a frequency transform processor for frequency transform encoding picture data from the picture input;

a coefficient quantize for quantizing the encoded picture data according to a quantization step size;

an encoding quality estimator for measuring an encoding quality of quantized encoded pictures; and a bit rate controller for dynamically controlling the quantization step size of the coefficient quantize based on the predicted current bit rate and a comparison of the target quality and the measured quality so that the encoder output remains within the upper and lower bit rate limits.

The video picture encoder may further include a frame bit counter for a number of remaining bits available for encoding a group of pictures, and a bit allocation processor for controlling the bit rate controller according to the remaining available bits.

The video picture encoder may further include a quality comparator for comparing the target quality with a measured encoding quality, and wherein the bit rate controller controls the quantization step size based on a difference between the target and measured qualities.

In one form of the encoder, the measured encoding quality comprises the quantization step size.

The video picture encoder may further include a local decoder for decoding the quantized encoded picture data, and a quality measurement processor for determining a quality difference between corresponding input and locally decoded pictures.

In another form of the encoder, the quality measurement processor determines a difference in signal-to-noise ratio. Alternatively, the quality measurement processor may determine a mean square error.

It is possible in most applications that only a maximum bit rate and optionally a minimum bit rate are specified. Such applications may include a randomly accessible recording medium or packetized communication network with variable instantaneous bit rate but also a maximum bandwidth specification. In addition, such applications may also require that the input must be compressed in real-time, for example, live broadcasting or live recording cannot make use of multi-pass encoding. Therefore, it is also an object of the present invention to provide an encoder which can be operated in real time in a variable bit rate mode within the maximum and minimum bitrate boundary of the target application.

While encoding an input moving picture sequence, the present invention continuously measures the resulting encoding picture quality, compares it to a defined target quality, and adjusts the encoding bit rate accordingly. By varying the target bit rate of the encoder within a defined maximum bit rate and a minimum bit rate according to a defined target encoded picture quality and the scene complexity, the encoder ensures consistent picture quality when possible and also that the maximum and minimum bit rate of the target application are not violated.

BRIEF DESCRIPTION OF THE DRAWINGS

The invention is described in greater detail hereinafter, by way of example only, with reference to the accompanying drawings, wherein.

DETAILED DESCRIPTION OF THE PREFERRED EMBODIMENTS

Figure 1:
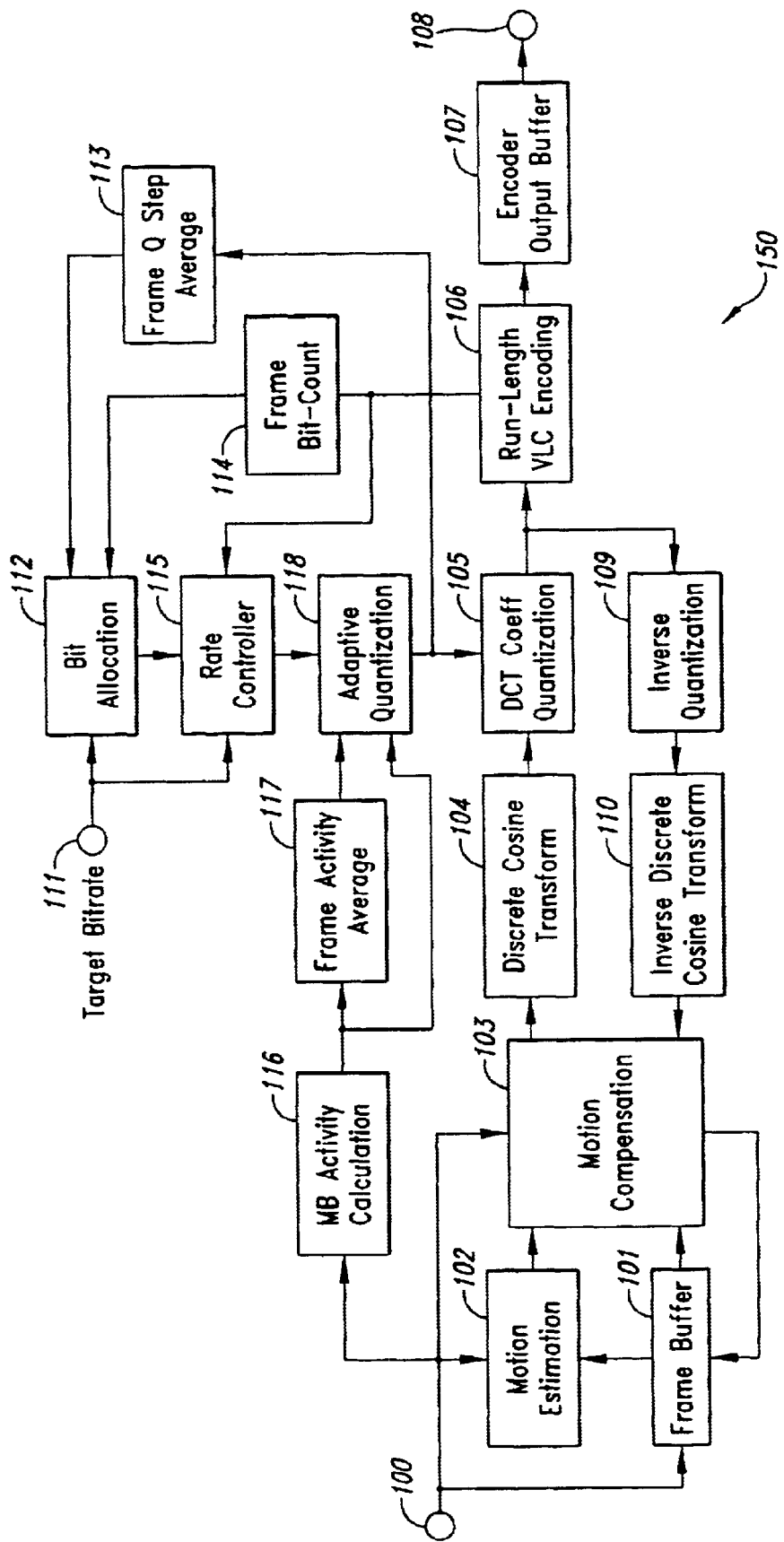
FIG. 1 is a block diagram of an MPEG compliant constant bit rate video encoder constructed according to the prior art.

A block diagram of a generalized MPEG compliant video encoder 150 is illustrated in FIG. 1. A sequence of moving pictures (e.g. video) is input at 100 to the encoder 150 where it is compressed with a user defined target bitrate provided at 111. The target bitrate is set according to the communication channel bandwidth in which the compressed video is to be transmitted, or to the storage media capacity in which a target duration of the compressed video is to be stored.

Input pictures, which may be pre-processed for noise reduction or other purposes, are labelled as either I-pictures, P-pictures, or B-pictures, and stored in a frame buffer 101 according to re-ordering and processing needs. The I-pictures are intra-coded pictures used mainly for random access or scene update. The P-pictures use forward motion predictive coding with reference to previously coded I- or P-pictures (anchor pictures), and the B-pictures use both forward and backward motion predictive/interpolative coding with reference to previously coded I- or P-pictures.

Furthermore, a group of pictures (GOP) is formed in encoded order starting with an I-picture and ending with the picture immediately before the next I-picture in the sequence. In the case of an MPEG-2 encoder, the input picture sequence may be either a field or frame structure sequence derived for an interlaced or progressive source.

All pictures are partitioned into smaller and non-overlapping blocks of pixel data called Macroblocks (MBs) before actual encoding. Each MB from a P- or B-picture is subjected to a motion estimation process 102 in which forward motion vector(s), ad backward motion vector(s) for the case of a B-picture MB, are determined using reference picture(s) from the frame buffer 101. With the determined motion vector(s), motion compensation 103 is performed where the intra- or inter-picture prediction mode of the MB is first determined according to the accuracy of the motion vector(s) found, followed by generating the necessary predicted MB. For the case of an I-picture MB or intra-mode MB, the predicted MB is the input MB (i.e. no prediction).

The predicted MB is subjected to discrete cosine transform (DCT) 104 and DCT coefficient quantization 105 based on quantization matrices (QM) and quantization stepsize (QS). Note that for MPEG-2, field or frame based DCT can be selected in 104. The quantized DCT coefficients of the MB is then run-length encoded with variable length codes (VLC) at 106 and multiplexed with all necessary side information, for example selected motion vectors, MB coding modes, quantization on stepsize, picture and sequence information, to form the output bitstream. The bitstream is stored in an encoder output buffer 107 for output at 108.

Local decoding is performed by inverse quantizing the quantized DCT coefficients (109), followed by inverse DCT 110, necessary motion compensation 103, and finally storing the reconstructed MB into frame buffer 101. Local decoding is performed such that the reference pictures used by motion compensation 103 is identical to those to be used by an external decoder.

The quantization stepsize (QS) used in 118 for quantizing the DCT coefficients of each MB has a direct impact on the number of bits produced at the output of the run-length VLC encoding process 106, and therefore the average output bit rate. It has also a direct impact on the encoding quality, which is output picture quality at the corresponding decoder. In general, larger QS generates lower output bit rate and lower encoding quality. In order to control output bit rate and picture quality so that the resulting bitstream can satisfy channel bandwidth or storage limitations as well as quality requirements, rate control and quantization control algorithms are used.

Previously used methods for rate control and quantization control can be found in the MPEG-2 TM5 (Test Model 5), which can be summarized in three steps. Step one is the bit allocation process 112 which assigns a target number of bits ($T_I$, $T_P$, or $T_B$ respectively) for a new I-, P- or B-picture to be coded. The target number of bits can be computed as follows:

$$T_I = \max\left[\frac{R}{1 + \frac{N_P X_P}{X_I K_P} + \frac{N_B X_B}{X_I K_B}}, \frac{\text{Bit\_Rate}}{8 \times \text{Picture\_Rate}}\right]$$

-continued $$T_P = \max\left[\frac{R}{N_P + \frac{N_B K_P X_B}{K_B X_P}}, \frac{\text{Bit\_Rate}}{8 \times \text{Picture\_Rate}}\right]$$

$$T_B = \max\left[\frac{R}{N_B + \frac{N_P K_B X_P}{K_P X_B}}, \frac{\text{Bit\_Rate}}{8 \times \text{Picture\_Rate}}\right]$$

where $X_I = S_I Q_I$, $X_P = S_P Q_P$, $X_B = S_B, Q_B$, $S_I$, $S_P$, $S_B$ are number of bits generated by previously encoded I-, P-, B-picture respectively as computed by block 114, $Q_I$, $Q_P$, $Q_B$ are the average QS used by previously encoded I-, P-, B-picture respectively as computed by block 113, Bit_Rate is the Target Bitrate supplied at 111, Picture_Rate is number of pictures coded per second, $K_P$ and $K_B$ are constants (e.g. 1.0 and 1.4 respectively), $N_P$ and $N_B$ are the number of P- and B-pictures remaining in the current GOP.

R is the remaining number of bits assigned to the GOP, where R is updated as follows:

After encoding a picture, $R = R - S_{I,P,B}$ where $S_{I,P,B}$ is the number of bits generated in the picture just encoded (picture type is I, P, or B)

Before encoding the first picture in a GOP (an I-picture):

R=G+R

G=Bit_Rate*N/Picture_Rate

N is the number of pictures in the GOP.

In the second step, rate control (115) is performed. Basically, this step involves calculation of a reference quantization stepsize $QS_{ref}$ for each MB based on the target bits ($T_I$, $T_P$, or $T_B$) for the picture, the accumulated number of bits used from the target bits, and a virtual buffer model as given in MPEG-2 TM5.

Adaptive quantisation 118 is used in the third step for quantization control. In this step, the calculated $QS_{ref}$ is scaled according to the local activities of the MB as generated by an MB activity calculation process 116, and the average MB activity of the previously coded picture (or optionally current picture) as produced by a frame activity average process 117. This scaling is done according to a level of masking effects of coding noise by human perception for MBs with high or low activities within a picture. As previously mentioned, an example of an adaptive quantization technique can be found in U.S. Pat. No. 5,650,860, "Adaptive Quantization".

The frame bit-count module 114 may contain a video buffer verifier (VBV) which is a virtual model of an input buffer of an external decoder. The VBV is maintained in such a way that underflow and overflow are prevented as required by the MPEG standard to ensure target bit rate 111 is maintained. Techniques for underflow detection and protection may also be found in U.S. Pat. No. 5,650,860.

As mentioned, this form of encoding does not take account of the actual or varying complexity of the video scenes contained in the input picture sequence 100. Consequently, the perceptual quality of the resulting pictures may vary from good to annoying from scene to scene according to scene complexity. Variable bit rate (VBR) coding may be therefore be applied on individual segments of the picture sequences depending on its scene complexity to maximize bit rate allocation and encoded picture quality, and the bandwidth saving used for coding of more complex scenes, for example. However, existing VBR control algorithms such as that disclosed in U.S. Pat. No. 5,650,860 require multiple encoding passes to properly distribute data bits. Multiple-pass VBR encoder require huge storage memory for storing the intermediate bit utilization information, and large computation needs for the additional passes and the bit budgets generation, and furthermore such techniques cannot process the input sequence in real-time.

Before encoding an input picture sequence, an encoder according to an embodiment of the present invention is set with maximum and minimum bit rate of target application (the minimum bit rate for some applications may be zero), and a target quality for encoded pictures. An initial target bit rate will then be set or generated. The encoder compresses the input sequence according to this target bit rate using conventional bit rate control method.

After encoding a picture or a certain number of pictures, the encoding quality (quality of encoded pictures) is measured against the target. If the encoding quality is lower than the target quality, the target encoding bit rate will be increased. On the other hand, if the encoding quality is higher than the target quality, the target bit rate will be decreased. The level of new target bit rate adjustment may depend on the current target bit rate and the predicted bit rate based on encoding history so that it is not over adjusted unnecessarily. The new target bit rate is also checked against the defined maximum and minimum bit rate.

The encoder will then re-adjust its rate control system with the new target bit rate, and continue to encode the rest of the input sequence. Furthermore, the encoder can ensure VBV compliant with existing methods using the defined maximum bit rate and/or the target bit rate. The process of determining new target bit rate based on encoding quality of past encoded picture(s) is repeated as needed.

Figure 2:
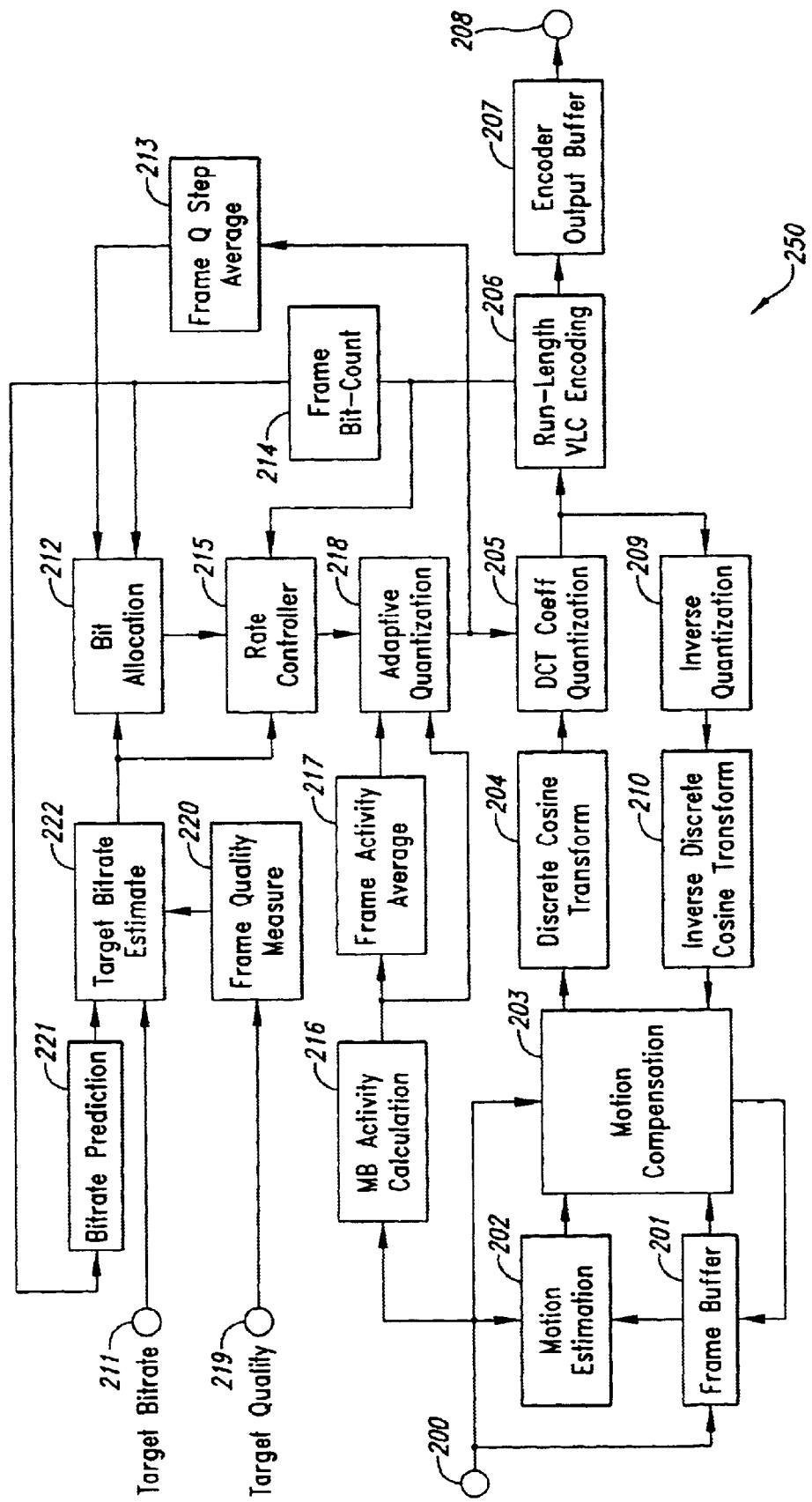
FIG. 2 is a block diagram of a variable bit rate moving pictures encoder according to one embodiment of the present invention.

In FIG. 2 a block diagram of a one-pass variable bit rate moving pictures encoder 250 according to one embodiment of the present invention is illustrated. Those of ordinary skill in the art will recognise that a number of the functional blocks illustrated are common with the conventional MPEG encoder described above. The input moving picture sequence 200 is processed picture by picture according to its possible assigned picture coding type (I-, P-, of B-picture). A frame buffer 201 is used to temporarily store the input pictures according to re-ordering and processing needs. Each input picture is divided into Macroblocks (MB) before encoding. Temporal redundancy of each MB may be removed by motion estimation 202 and motion compensation 203.

After necessary motion compensation, a MB is subjected to discrete cosine transform (DCT) 204 and DCT coefficient quantization 205 based on quantization matrices and quantization stepsize. The quantized MB of I- or P-picture is inverse quantized 209, inverse discrete cosine transformed 210, and subjected to corresponding motion compensation 203 so that the quantized MB is reconstructed and stored locally in frame buffer 201 for future motion estimation and compensation needs. The quantized MB is run-length encoded with VLC (variable length coding) at 206, together with all necessary side information to form the encoded bitstream of the input sequence. The encoded bitstream is stored in an output buffer 207 of the encoder for output at 208 at desired data rates.

Methods of motion estimation 202, motion compensation 203, DCT 204, DCT coefficient quantization 205, run-length VLC encoding 206, inverse quantization 209, and inverse DCT 210 may be those defined and/or allowed in the ISO/IEC MPEG-1 or MPEG-2 standards.

Before encoding, a target cuality of encoding (219) and maximum/minimum bit rate (211) are set. The maximum and minimum bit rates ($BR_{max}$ and $BR_{min}$), given as bits per second, define the boundary bit rates which the encoder shall operate at, and the target quality defines the encoded picture quality that the encoder shall target by constantly adjusting a target bit rate within the given bit rate boundaries. The minimum bit rate may be set to zero.

Initially, target bit rate estimation 223 may be performed based the set target quality and the max/min bit rates to generate an initial target bit rate ($BR_{target}$). Such initial estimate may be based on experimentally determined fixed values which may not directly relate to the picture(s) to be coded. With the target bit rate, the bit allocation 212 is performed to determine a target number of bits for the picture to be coded ($T_{I,P,B}$). A rate controller 215 determines a reference quantization step size ($QS_{ref}$) for each MB based on the estimated number of bits for the picture ($T_{I,B,P}$) and the bit utilization by the run-length VLC encoder 206. The $QS_{ref}$ of each MB in the picture to be coded can be computed, for example, as follows:

$$QS_{ref} = \frac{D_{I,P,B} \times K_I}{(2 \times BR_{target}/\text{picture\_rate})}$$

where $D_{I,P,B}$ is virtual buffer fullness of corresponding I-, P-, or B-picture, updated (after coding each MB) by the difference between the bits used by the MB and the bits allocated to the MB based on the corresponding $T_{I,B,P}$, a set of initial values for $D_I$, $D_P$, $D_B$ may be assumed at sequence start, and $K_I$ is a constant (eg. 31).

Adaptive quantization 218 may be applied in which the determined $QS_{ref}$ is scaled according to the local activities of the MB as generated by MB activity calculation process 216 and the average MB activity of the previously coded (or optionally current picture) as produced by the frame activity average process 217. Example implementations of the MB activity calculation 216, frame activity average 217, and adaptive quantization process 218 are found in MPEG-2 TM5. The output quantization stepsize (QS) is used to quantized DCT coefficients of the MB.

After encoding a picture, the number of bits ($S_{I,P,B}$, corresponding value for I-, P-, or B-picture) generated by encoding the picture is accumulated by Frame Bit-Count 214, and the quantization stepsize (QS) is averaged by Frame Q Step Average 213 process. The encoded picture quality is also determined by Frame Quality Measure 220 process. One method of determining the encoded picture quality is by the average value of the reference quantization stepsize ($QS_{average}$) used for coding the picture since it indicates roughly the amount of quantization noise in the encoded picture. In this method, the target quality set at 219 is defined as the target reference quantization stepsize ($QS_{target}$). Three different $QS_{target}$ values may be set at 219 for corresponding I-, P-, and B-pictures; alternatively, the values can be determined by:

$QS_{target}$ for I-pictures=$QS_{target}$ $QS_{target}$ for P-pictures=$K_P*QS_{target}$ $QS_{target}$ for B-pictures=$K_B*QS_{target}$ where $K_P$ and $K_B$ are constants which can be experimentally determined (example $K_P$=1.0 and $K_B$=1.4).

A further condition may be applied to the final $QS_{target}$ for B-pictures such that it is not lower than the $QS_{average}$ of the last coded I- or P-picture so that bits can be efficiently used to improve the quality of anchor I- or P-pictures first before improving the quality of the B-pictures.

In the process of Frame Quality Measure 220 process, the target quality $QS_{target}$ is compared to the picture quality $QS_{average}$. Since a higher value of $QS_{average}$ implies higher quantization noise and therefore lower encoded picture quality, when the value of $QS_{average}$ is found to be higher than $QS_{target}$, the difference of the two values will be used to increase the target bit rate ($BR_{target}$) at target bitrate estimator 222. On the other hand, when $QS_{average}$ is lower than $QS_{target}$, $BR_{target}$ is decreased at target bitrate estimator 222. Optionally, the value of $QS_{target}$ may be used at the rate controller 215 as a lower limit for the final output $QS_{ref}$ value so that when the target is reached (target quality reached), bits are saved for future encoding immediately. Hence, the output reference quantization stepsize at rate controller 215 may be set according to:

if ($QS_{ref}$<$QS_{target}$), then $QS_{ref}$=$QS_{target}$.

For target bit rate estimation, a rate-quantization model for example one developed by Wei Ding and Bede Liu, "Rate Control of MPEG Video Coding and Recording by Rate-Quantization Modelling", IEEE Trans. on Circuit and Systems for Video Technology, Vol. 6, No. 1, February 1996, may be adopted. To avoid large estimation error or complex local fitting of the rate-quantization model, an alternative embodiment of the present invention may consist of a method of target bitrate estimation comprising the steps of predicting a bitrate ($BR_{predicted}$) at a Bitrate Predictor 221 based on bits used for encoding the last I-, P-, and B-picture, and estimating a new target bitrate ($BR_{target}$) at the target bitrate estimator 222 based on the said predicted bit rate and the difference between $QS_{average}$ and $QS_{target}$. The predicted bitrate ($BR_{predicted}$) and the new target bitrate ($BR_{target}$) may be computed as follows:

$$BR_{predicted} = \frac{(S_I + n_P \times S_P + n_B \times S_B)}{(1 + n_P + n_B)}$$

$$BR_{target} = BR_{predicted} + K_2 \times \frac{(QS_{average} - QS_{target})}{QS_{average}}$$

if ($BR_{target}$>$BR_{max}$), then $BR_{target}$=$BR_{max}$ if ($BR_{target}$<$BR_{min}$), then $BR_{target}$=$BR_{min}$ where $S_I$, $S_P$, $S_B$ are number of bits generated by previously encoded I-, P-, B-picture, $n_P$ is the total number of P-pictures in the current GOP, $n_B$ is the total number of B-pictures in the current GOP, and $K_2$ may be a constant, or a factor of $BR_{predicted}$, $BR_{max}$, or $BR_{target}$.

The new target bit rate ($BR_{target}$) can be computed after encoding each picture or after encoding a certain number of pictures. The bit allocation process 212 and the rate controller 215 are updated with the new $BR_{target}$ value once it is determined. An embodiment of the bit allocation process 212 comprises the steps of:

a) Before encoding the first picture in a group of pictures (GOP), determining R which is the remaining number of bits assigned to the GOP:

$$R \mathrel{+}= \frac{N}{\text{picture\_rate}} \times BR_{target}, \text{ then set } BR_{old\_target} = BR_{target}$$

where:
N is the number of pictures in the GOP
R=0 before start of sequence, and
+=is the accumulate function b) Otherwise, if the picture to be coded is not the first picture of a GOP and a new target bit rate ($BR_{target}$) is determined, then updating R as given by:

$$R \mathrel{+}= \frac{(N_P + N_B)}{\text{picture\_rate}} \times (BR_{target} - BR_{old\_target}),$$

then set $BR_{old\_target} = BR_{target}$ where:
$N_P$ and $N_B$ are the number of P- and B-pictures remaining in the current GOP c) Obtaining the average quantization stepsize ($Q_I$, $Q_P$, or $Q_B$) from previously encoded pictures (I-, P-, or B-picture respectively) as determined by Frame Q Step average process 213, d) Obtaining from frame bit-count 214 the value of the number of bits ($S_I$, $S_P$, or $S_B$) used to encode the past I-, P-, or B-pictures, and removing number of bits used by the last coded picture ($S_{I,P,B}$) from R, hence:

$R \mathrel{-}= S_I$  if last coded picture is an I-picture $R \mathrel{-}= S_P$  if last coded picture is an P-picture $R \mathrel{-}= S_B$  if last coded picture is an B-picture e) Finally, determining the target number of bits ($T_I$, $T_P$, or $T_B$) to be used for coding the current picture. $T_I$, $T_P$, or $T_B$ for respective I-, P-, or B-picture are given, for example, by:

$$T_I = \frac{R}{1 + \frac{N_P X_P}{X_I K_P} + \frac{N_B X_B}{X_I K_B}}$$

$$T_P = \frac{R}{N_P + \frac{N_B K_P X_B}{K_B X_P}}$$

$$T_B = \frac{R}{N_B + \frac{N_P K_B X_P}{K_P X_B}}$$

where
$X_I = S_I Q_I$, $X_P = S_P Q_P$, $X_B = S_B Q_B$,
$K_P$ and $K_B$ are constants.

A minimum value ($T_{min}$) may be set as the lower boundary for $T_I$, $T_P$, $T_B$. For example:

$$T_{min} = \frac{BR_{target}}{K_3 \times \text{Picture\_Rate}},$$

Figure 3:
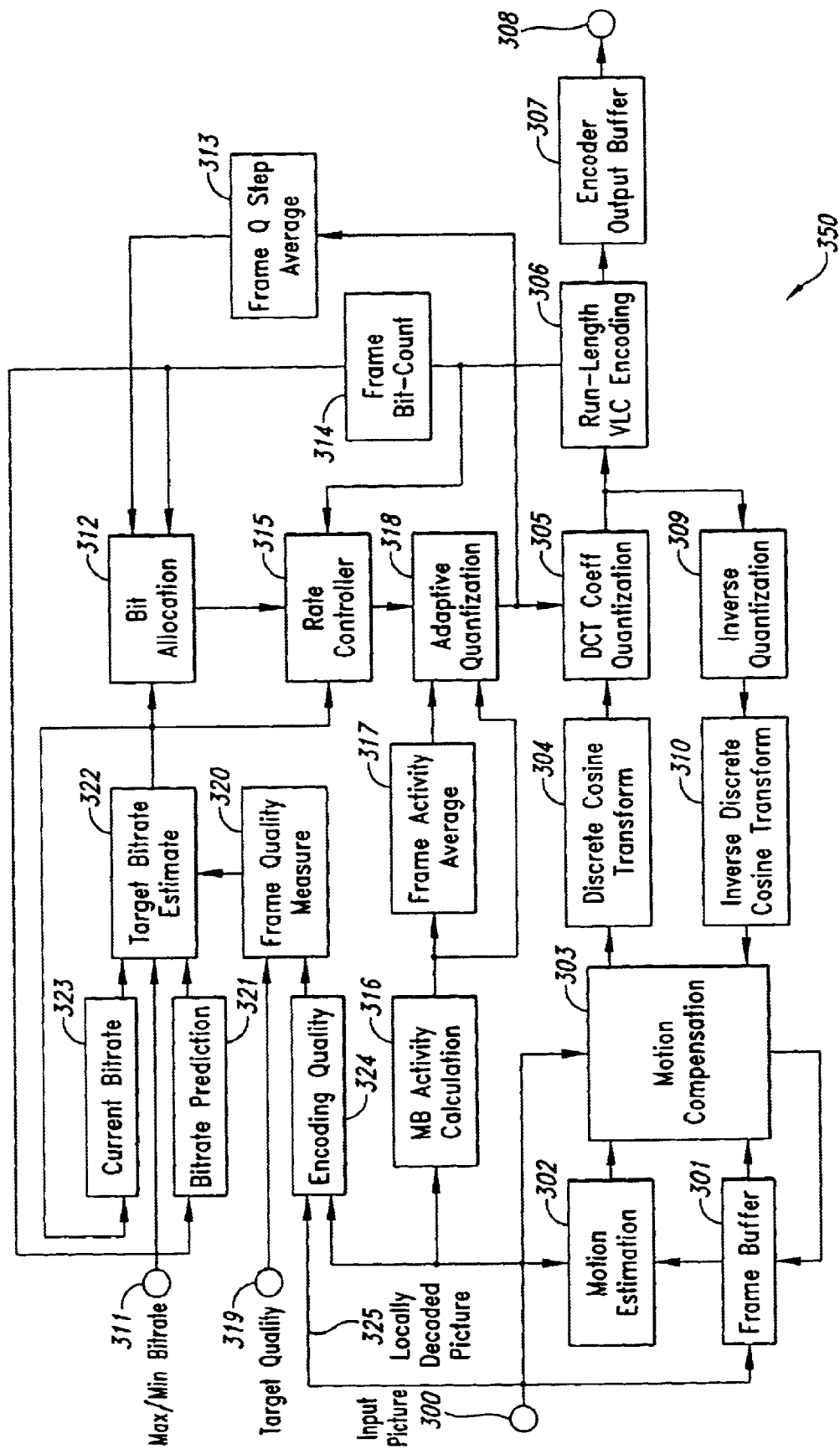
FIG. 3 is a block diagram of a moving pictures encoder according to an alternate embodiment of the present invention.

FIG. 3 is a block diagram illustrating another embodiment of a one-pass variable bit rate moving pictures encoder 350 according to the present invention. In this embodiment, the encoding quality 324 is determined by comparing the original input picture taken from input 300 and the locally decoded picture 325. Conventional methods such as the mean square error (MSE) or the signal-to-noise ratio (SNR) measures can be used as comparison. This measure is further compared at Frame Quality Measure 320 with the definable Target Quality 319. When the encoding quality is lower than the target quality, the target bitrate estimator 322 will set the target bitrate higher, on the other hand, if the encoding quality is higher than the target quality, the target bitrate is set lower.

An input picture or a given number of input pictures are first encoded with an initial set of encoding parameters. Each of these pictures may be given a picture coding type of either I-, P-, or B-picture. The encoding technique such as those defined by the MPEG-1 or MPEG-2 standards may be utilized. Such techniques include motion estimation 302, motion compensation 303, discrete cosine transform 304, DCT coefficient quantization 305, and run-length VLC encoding 306 for temporal, spatial, and statistical redundancy reduction. A frame buffer 301 is used for storing the input pictures for re-ordering and processing needs.

Before each picture is coded, its target amount of bits is set by bit allocation process 312 based on the initial set of coding parameters as well as any updated information from Frame Q Step averaging process 313 and Frame bit-count 314. Rate Controller 315 determines reference quantization stepsize for each MB while coding the picture. Conventional adaptive quantization 318 which depends on MB activity calculation 316 and frame activity average 317 can be applied to each reference quantization stepsize to generate final quantization stepsize for the DCT Coeff quantizer 305.

The coded pictures are locally decoded by inverse quantization 309, inverse discrete cosine transform 310, inverse of the motion compensation 303 to form the locally decoded pictures 325. It is stored in the frame buffer 301 if necessary for future prediction use (ie. anchor pictures). The locally decoded pictures 325 are used with reference to the original input pictures 300 for encoding quality determination 324. The determined encoding quality is compared to the target quality given by 319 at frame quality measure process 320. It is also possible to offset the determined encoding quality by the picture activity ($ACT_{average}$) before the comparison so as to take into account the masking effects of the human visual system to the average level of activity within the picture. For example if the encoding quality is determined by the peak signal-to-noise ratio, then the resulting encoding quality difference ($SNR_{diff}$) at the output of frame quality measure 320 can be given by:

$$SNR_{diff} = SNR_{target} - (SNR_{picture} + K_5 \times ACT_{average})$$

where
$SNR_{picture}$ is the output of encoding quality measure 324,
$SNR_{target}$ is the target quality definable at 319,
$K_5$ is a constant (eg. 0.018), and
$ACT_{average}$ is the average MB luminance block variance.

One method of adjusting $BR_{target}$ based on $SNR_{diff}$ at the target bitrate estimator 322 is given by:

$$BR_{target} = BR_{predicted} + K_6 \times BR_{current} \times SNR_{diff}$$

if ($BR_{target} > BR_{max}$), then $BR_{target} = BR_{max}$ if ($BR_{target} < BR_{min}$), then $BR_{target} = BR_{min}$ where $BR_{predicted}$ is the result of bitrate predictor 321, $BR_{current}$ is the previous value of $BR_{target}$ stored at current bitrate 323 memory, $K_6$ is a suitable constant, $BR_{max}$ and $BR_{min}$ are the maximum and minimum bitrate set at 311.

The bit allocation module 312 and the rate controller 315 take the updated $BR_{target}$ from the target bitrate estimator 322 and perform necessary bit allocation and bit rate control such that the resulting compressed moving picture bit-streams will have encoded bit rate close to $BR_{target}$. Existing techniques of VBV (video buffer verifier) underflow detection and protection may be applied using $BR_{max}$ as the reference bit rate to ensure the maximum bitrate of the output bitstream is not violated.

Because the target bit rate $BR_{target}$ for encoding is adapted based on feedback on encoding quality, the encoding quality will always converge to a defined target quality. In such a way the encoding accommodates variable bit rates in real-time within single computational pass, and the encoding process can be better tuned to changes in moving pictures scene content complexity. The overall perceptual quality of the encoded moving pictures sequence will be relatively consistent with reference to the defined target.

Embodiments according to the present invention can accommodate simplified models for estimation of target bit rate based on feedback and prediction. Overall impact to implementation and computation complexity as well as memory storage requirements of the encoder is minimized.

The foregoing detailed description of embodiments of the invention has been presented by way of example only, and is not intended to be considered limiting to the invention as defined in the claims appended hereto.

What is claimed is:

1. A method for variable bit rate control in a single pass moving pictures encoder, comprising:
   selecting a target picture encoding quality;
   selecting upper and lower bit rate limits;
   encoding at least one picture based on a target bit rate within the upper and lower bit rate limits;
   predicting a current bit rate and an encoding quality based on the result of the encoding step;
   comparing the encoding quality of the at least one encoded picture with the target picture encoding quality;
   adjusting the target bit rate within the upper and lower bit rate limits according to the result of said comparison and the predicted current bit rate, for encoding subsequent pictures; and
   repeating, for each picture in a sequence of pictures, said encoding, predicting, comparing and adjusting steps.

2. A method as claimed in claim 1, wherein the step of encoding at least one picture based on the target bit rate includes determining a target bit allocation for the at least one picture using the target bit rate.

3. A method as claimed in claim 2, wherein the pictures to be encoded are arranged in groups of pictures comprising an I-picture and at least one P-picture and/or B-picture, and wherein the target bit allocation is adjusted for each picture or plurality of pictures in each group of pictures.

4. A method as claimed in claim 1, 2 or 3, wherein the picture encoding quality is based on encoding quantization step-size.

5. A method as claimed in claim 1, 2 or 3, wherein the picture encoding quality is based on a mean square error.

6. A method as claimed in claim 1, 2 or 3, wherein the picture encoding quality is based on a signal-to-noise ratio.

7. A method as claimed in claim 5 or 6, wherein the comparing step includes measuring a difference in picture encoding quality between corresponding input and locally decoded pictures.

8. A method as claimed in claim 7, including measuring an average picture activity for the moving pictures, and modifying the measured difference in picture encoding quality on the basis of the average picture activity.

9. A method as claimed in claim 8, including measuring a signal-to-noise ratio for at least one previously encoded picture, and determining said target bit rate based on said predicted current bit rate and on a difference between the measured signal-to-noise ratio and a target signal-to-noise ratio as said target picture encoding quality.

10. A method as claimed in claim 9, wherein the predicted current bit rate and the target bit rate are determined according to:

$$SNR_{diff} = SNR_{target} - (SNR_{picture} + K_5 \times ACT_{average})$$

$$BR_{predicted} = \frac{(S_I + n_P \times S_P + n_B \times S_B)}{(1 + n_P + n_B)}$$

$$BR_{target} = BR_{predicted} + K_6 \times BR_{current} \times SNR_{diff}$$

where:

$SNR_{picture}$ is the measured signal-to-noise ratio, $SNR_{target}$ is the target signal-to-noise ratio, $ACT_{average}$ is the measured average pixel activity, $K_5$ and $K_6$ are constants, $SNR_{diff}$ is the measured difference in picture encoding quality, $BR_{predicted}$ is the predicted current bit rate, $S_I$, $S_P$, and $S_B$ are number of bits generated by said previously encoded I-, P-, B-pictures, respectively $n_P$ is a total number of P-pictures in the group of pictures, $n_B$ is a total number of B-pictures in the group of pictures, $BR_{current}$ is a previously determined $BR_{target}$, and $BR_{target}$ is said target bit rate.

11. A method as claimed in claim 4, wherein said target picture encoding quality is based on a target encoding quantization step-size.

12. A method as claimed in claim 11, wherein different target quantization step-sizes are selected for I-, P-, and B-pictures.

13. A method as claimed in claim 11 or 12, including measuring an average quantization step-size for at least one previously encoded picture, and determining said target bit rate based on said predicted current bit rate and a difference between the target encoding quantization step-size and the measured average quantization step-size.

14. A method as claimed in claim 13, wherein maximum and minimum bit rates are selected corresponding to the upper and lower bit rate limits, and wherein the predicted current bit rate and the target bit rate are determined according to:

$$BR_{predicted} = \frac{(S_I + n_P \times S_P + n_B \times S_B)}{(1 + n_P + n_B)}$$

$$BR_{target} = BR_{predicted} + K_2 \times \frac{(QS_{average} - QS_{target})}{QS_{average}}$$

if ($BR_{target} > BR_{max}$), then $BR_{target} = BR_{max}$ if ($BR_{target} < BR_{min}$), then $BR_{target} = BR_{min}$ where $BR_{predicted}$ is said predicted current bit rate, $BR_{target}$ is said target bit rate, $BR_{max}$ is said maximum bit rate, $BR_{min}$ is said minimum bit rate, $S_I$, $S_P$, $S_B$ are number of bits generated by said previously encoded I-, P-, B-pictures, respectively, $n_P$ is a total number of P-pictures in the group of pictures, $n_B$ is a total number of B-pictures in the group of pictures, and $K_2$ is a constant or a factor of $BR_{predicted}$, $BR_{max}$, or previous $BR_{target}$.

15. A method as claimed in claim 10 or 14, including determining a number of bits R remaining for encoding the group of pictures comprising the steps of:

before encoding a first picture in a said group of pictures, determining R according to $$R \mathrel{+}= \frac{N}{\text{picture\_rate}} \times BR_{target}, \text{ then set } BR_{\text{old\_target}} = BR_{target}$$

where:

N is the number of pictures in the group of pictures, picture_rate is the number of pictures encoded per unit time, and $BR_{target}$ is said target bitrate, and before encoding each subsequent picture in the group of pictures, determining R according to $$R \mathrel{+}= \frac{(N_P + N_B)}{\text{picture\_rate}} \times (BR_{target} - BR_{\text{old\_target}}),$$

$-S$, then set $BR_{\text{old\_target}} = BR_{target}$ where:

$N_P$ and $N_B$ are the number of P- and B-pictures remaining in the current group of pictures, $BR_{target}$ is a subsequently determined target bit rate, and S is one of $S_I$, $S_P$ or $S_B$ according to the picture type of the previously encoded picture.

16. A method as claimed in claim 15, further comprising the steps of:

obtaining average quantization step sizes $Q_I$, $Q_P$, $Q_B$ from previously encoded I-, P-, B-pictures, respectively; and determining the target bit allocation $T_I$, $T_P$, $T_B$ for a subsequent respective I-, P-, or B-picture according to:

$$T_I = \frac{R}{1 + \frac{N_P X_P}{X_I K_P} + \frac{N_B X_B}{X_I K_B}}$$

$$T_P = \frac{R}{N_P + \frac{N_B K_P X_B}{K_B X_P}}$$

$$T_B = \frac{R}{N_B + \frac{N_P K_B X_P}{K_P X_B}}$$

where:

$X_I = S_I Q_I$, $X_P = S_P Q_P$, $X_B = S_B Q_B$, $K_P$ and $K_B$ are constants.

17. A method as claimed in claim 16, wherein the target bit allocations $T_I$, $T_P$, $T_B$ have a lower limit $T_{min}$ determined according to:

$$T_{min} = \frac{BR_{target}}{K_3 \times \text{picture\_rate}}$$

where $K_3$ is a constant.

18. A method as claimed in any one of claims 1 to 17, wherein the target bit allocation is used to encode an input picture, comprising the steps of:

deriving macroblocks from the input picture;

calculating a quantization step-size for each said macroblock according to the target bit allocation and its utilization;

performing motion compensation if necessary to each macroblock;

frequency transforming each said macroblock or motion compensated macroblock;

quantizing each transformed macroblock using the calculated quantization step-size; and coding the quantized macroblock.

19. A method as claimed in claim 18, wherein the target quantization step-size is used as a lower limit for the determined quantization step-size.

20. A method as claimed in claim 18 or 19, wherein the determined quantization step-size for each macroblock is modulated by a corresponding macroblock activity masking factor, and the quantization is performed using the modulated quantization step-size.

21. A control apparatus for a single pass moving pictures encoder, comprising:

an input for receiving a target picture encoding quality;

an input for receiving upper and lower bit rate limits; and a controller for controlling the encoder so as to encode at least one picture according to a target bit rate within the upper and lower bit rate limits, predict a current bit rate and an encoding quality based on the result of the encoding, compare the encoding quality of the at least one encoded picture with the target picture encoding quality, and adjust the target bit rate according to the result of said comparison and the predicted current bit rate for encoding subsequent pictures.

22. A control apparatus as claimed in claim 21, wherein encoding the at least one picture based on the target bit rate includes determining a target bit allocation for the at least one picture using the target bit rate.

23. A control apparatus as claimed in claim 22, wherein the pictures to be encoded are arranged in groups of pictures comprising an I-picture and at least one P-picture and/or B-picture, and wherein the controller adjusts the target bit allocation for each picture or plurality of pictures in each group of pictures.

24. A control apparatus as claimed in claim 21, 22 or 23, wherein the picture encoding quality is based on encoding quantization step-size.

25. A control apparatus as claimed in claim 21, 22 or 23, wherein the picture encoding quality is based on a mean square error.

26. A control apparatus as claimed in claim 21, 22 or 23, wherein the picture encoding quality is based on a signal-to-noise ratio.

27. A control apparatus as claimed in claim 25 or 26, wherein the controller includes a local picture decoder and a comparator for measuring a difference in picture encoding quality between corresponding input and locally decoded pictures.

28. A control apparatus as claimed in claim 27, wherein the controller includes a picture activity processor for measuring an average picture activity for the moving pictures, and wherein the controller modifies the measured difference in picture encoding quality on the basis of the average picture activity.

29. A control apparatus as claimed in claim 28, wherein the controller includes a signal-to-noise processor for measuring a signal-to-noise ratio for at least one previously encoded picture, and a bit rate predictor for predicting the current bit rate, and wherein the controller adjusts said target bit rate based on the predicted current bit rate and on a difference between the measured signal-to-noise ratio and a target signal-to-noise ratio as said target picture encoding quality.

30. A control apparatus as claimed in claim 21, wherein the moving picture encoder includes a frequency transform coefficient quantizer for quantization of the encoded picture data, and wherein the controller comprises a bit rate controller coupled to control the quantization step size of the quantizer, a quantization step size comparator for comparing, as a measure of encoding quality, an actual quantization step size with a target quantization step size based on the target picture encoding quality, a bit allocation processor coupled to control the bit rate controller according to a number of bits remaining for encoding a group of pictures, and a target bit rate estimator coupled to receive the upper and lower bit rate limits and coupled to the bit allocation processor and the bit rate controller for controlling the quantization so that the required bit rate for the quantized picture data is within the upper and lower bit rate limits.

31. A single pass variable bit rate video picture encoder comprising:

a picture input for receiving data for a plurality of moving pictures;

a target quality input for receiving a target quality measure for encoded pictures;

an encoder output for supplying encoded picture data;

a bit rate limit input for receiving upper and lower bit rate limits for the encoded picture data;

a bit rate predictor for predicting a current bit rate;

a frequency transform processor for frequency transform encoding picture data from the picture input;

a coefficient quantizer for quantizing the encoded picture data according to a quantization step size;

an encoding quality estimator for measuring an encoding quality of quantized encoded pictures; and a bit rate controller for dynamically controlling the quantization step size of the coefficient quantizer based on the predicted current bit rate and a comparison of the target quality and the measured quality so that the encoder output remains within the upper and lower bit rate limits.

32. A video picture encoder as claimed in claim 31, wherein the pictures to be encoded are arranged in groups of pictures comprising an I-picture and at least one P-picture and/or B-picture, the bit rate controller including a frame bit counter for a number of remaining bits available for encoding a group of pictures, and a bit allocation processor for controlling the bit rate controller according to the remaining available bits so as to adjust a target bit allocation for each picture or plurality of pictures in each group of pictures.

33. A video picture encoder as claimed in claim 31 or 32, including a quality comparator for comparing the target quality with the measured encoding quality, and wherein the bit rate controller controls the quantization step size based on a difference between the target and measured qualities.

34. A video picture encoder as claimed in claim 32, including a quality comparator for comparing the target quality with the measured encoding quality wherein the bit rate controller adjusts the target bit allocation to achieve a target bit rate for the picture or plurality of pictures in each group of pictures which is determined on the basis of an output from said quality comparator.

35. A video picture encoder as claimed in claim 31, 32, 33 or 34, wherein the measured encoding quality is based on the quantization step size.

36. A video picture encoder as claimed in claim 33, including a local decoder for decoding the quantized encoded picture data, and a quality measurement processor for determining a quality difference between corresponding input and locally decoded pictures.

37. A video picture encoder as claimed in claim 36, wherein the quality measurement processor determines a difference in signal-to-noise ratio.

38. A video picture encoder as claimed in claim 36, wherein the quality measurement processor determines a mean square error.

39. A video picture encoder as claimed in claim 36, 37 or 38, including a picture activity processor for measuring an average picture activity for the moving pictures, and wherein the quality measurement processor modifies the measured difference in picture encoding quality on the basis of the average picture activity.

40. A video picture encoder as claimed in claim 37, including a signal-to-noise processor for measuring a signal-to-noise ratio for at least one previously encoded picture, and a bit rate predictor for estimating a current bit rate, and wherein the bit rate controller adjusts said target bit allocation based on the estimated current bit rate and on a difference between the measured signal-to-noise ratio and a target signal-to-noise ratio as said target picture encoding quality.

41. A video picture encoder as claimed in claim 31, including a quantization step size comparator for comparing, as a measure of encoding quality, an actual quantization step size with a target quantization step size based on the target picture encoding quality, a bit allocation processor coupled to control the bit rate controller according to a number of bits remaining for encoding a group of pictures, and a target bit rate estimator coupled to receive the upper and lower bit rate limits and coupled to the bit allocation processor and the bit rate controller for controlling the quantization so that the required bit rate for the quantized picture data is within the upper and lower bit rate limits.

* * * * *